United States Patent
Sudo

(10) Patent No.: US 10,061,114 B2
(45) Date of Patent: Aug. 28, 2018

(54) EYEPIECE LENS, OBSERVATION APPARATUS INCLUDING THE EYEPIECE LENS AND IMAGE PICKUP APPARATUS INCLUDING THE EYEPIECE LENS

(71) Applicant: CANON KABUSHIKI KAISHA, Tokyo (JP)

(72) Inventor: Kenta Sudo, Tokyo (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 15/156,756

(22) Filed: May 17, 2016

(65) Prior Publication Data
US 2016/0363759 A1   Dec. 15, 2016

(30) Foreign Application Priority Data
Jun. 12, 2015   (JP) .................. 2015-119041

(51) Int. Cl.
| | |
|---|---|
| G02B 25/00 | (2006.01) |
| G02B 13/18 | (2006.01) |
| H04N 5/232 | (2006.01) |
| G02B 9/04 | (2006.01) |
| G02B 13/00 | (2006.01) |
| G02B 9/00 | (2006.01) |
| G02B 13/04 | (2006.01) |
| G02B 15/177 | (2006.01) |

(52) U.S. Cl.
CPC ....... *G02B 25/001* (2013.01); *H04N 5/23293* (2013.01); *G02B 9/00* (2013.01); *G02B 9/04* (2013.01); *G02B 13/002* (2013.01); *G02B 13/0035* (2013.01); *G02B 13/04* (2013.01); *G02B 13/18* (2013.01); *G02B 15/177* (2013.01)

(58) Field of Classification Search
CPC ...... G02B 13/18; G02B 13/04; G02B 25/001; G02B 9/04; G02B 13/002; G02B 13/0035; G02B 15/177; G02B 9/00
USPC .......... 359/643, 646, 717, 753, 793
See application file for complete search history.

(56) References Cited

U.S. PATENT DOCUMENTS

2015/0116823 A1*  4/2015  Kanai ................ G02B 23/145
                                                    359/432

FOREIGN PATENT DOCUMENTS

| JP | 2000-098266 A | 4/2000 |
|---|---|---|
| JP | 2004-109961 A | 4/2004 |

* cited by examiner

*Primary Examiner* — Evelyn A Lester
(74) *Attorney, Agent, or Firm* — Carter, Deluca, Farrell & Schmidt, LLP

(57) ABSTRACT

Provided is an eyepiece lens to be used for observing an image displayed on an image displaying surface, the eyepiece lens consisting of, in order from the image displaying surface side to an observation side: a first lens unit having a negative refractive power; and a second lens unit having a positive refractive power. The first lens unit consists of one negative lens, and the second lens unit consists of, in order from the image displaying surface side to the observation side, a positive lens and a negative lens that has a concave surface facing the observation side. During adjustment of a diopter, the first lens unit is configured to not move, and the second lens unit is configured to move.

10 Claims, 8 Drawing Sheets

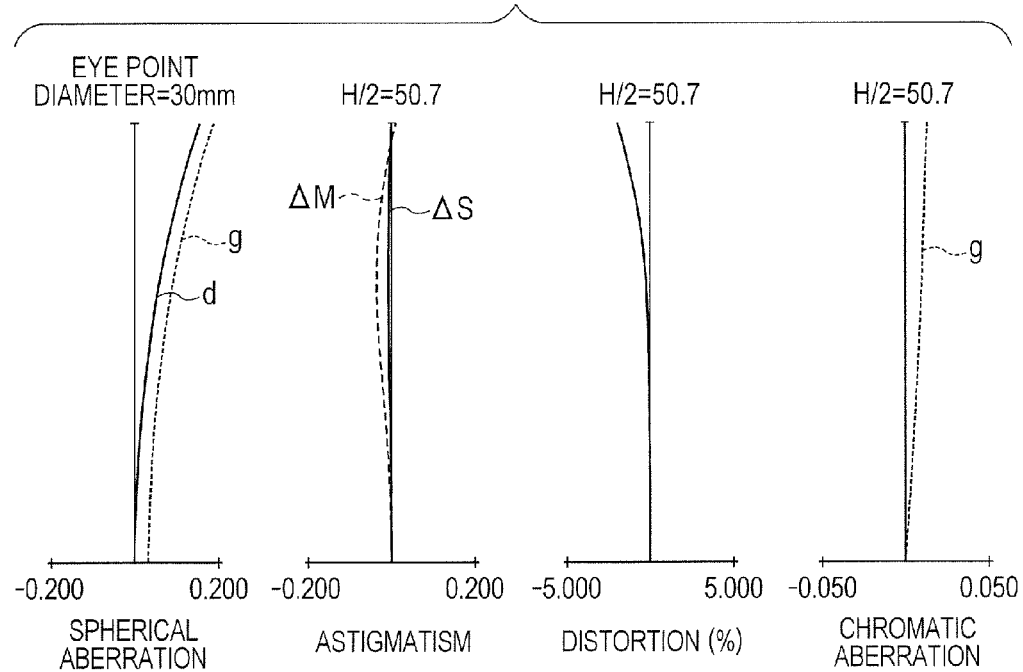
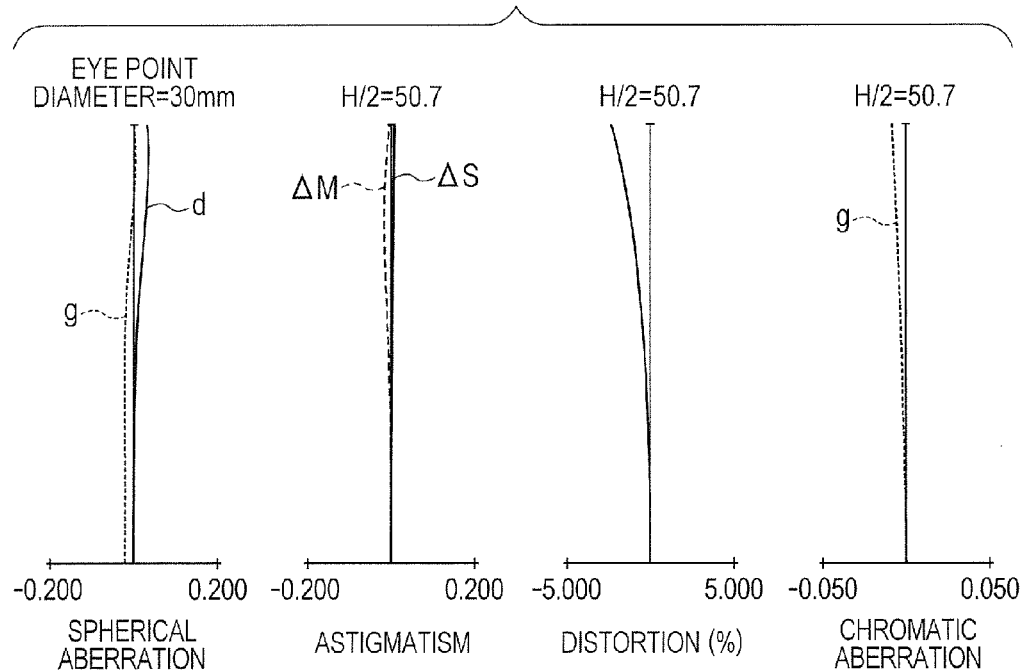

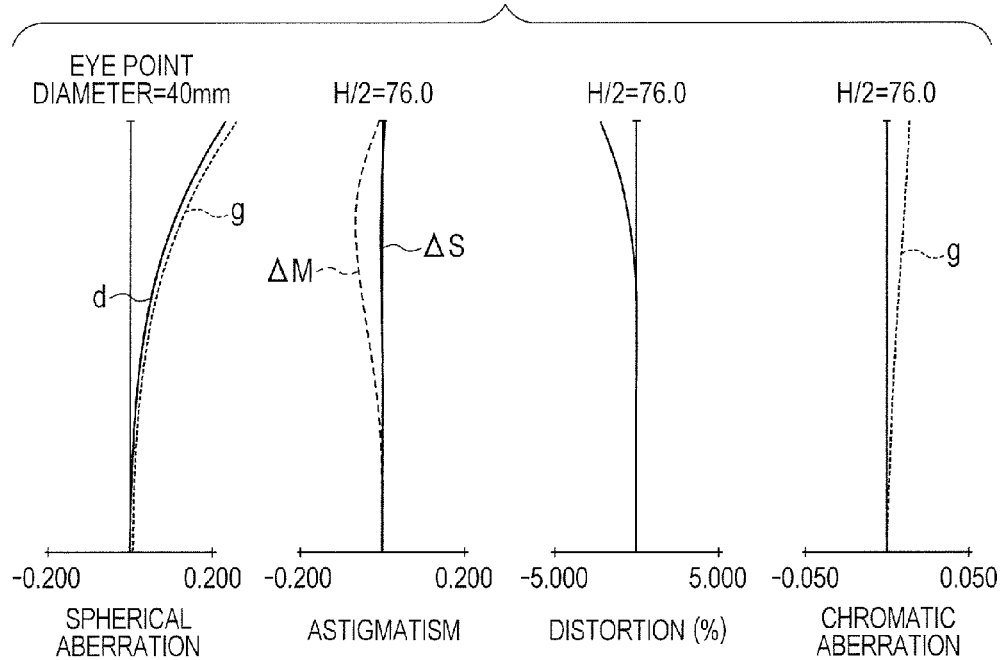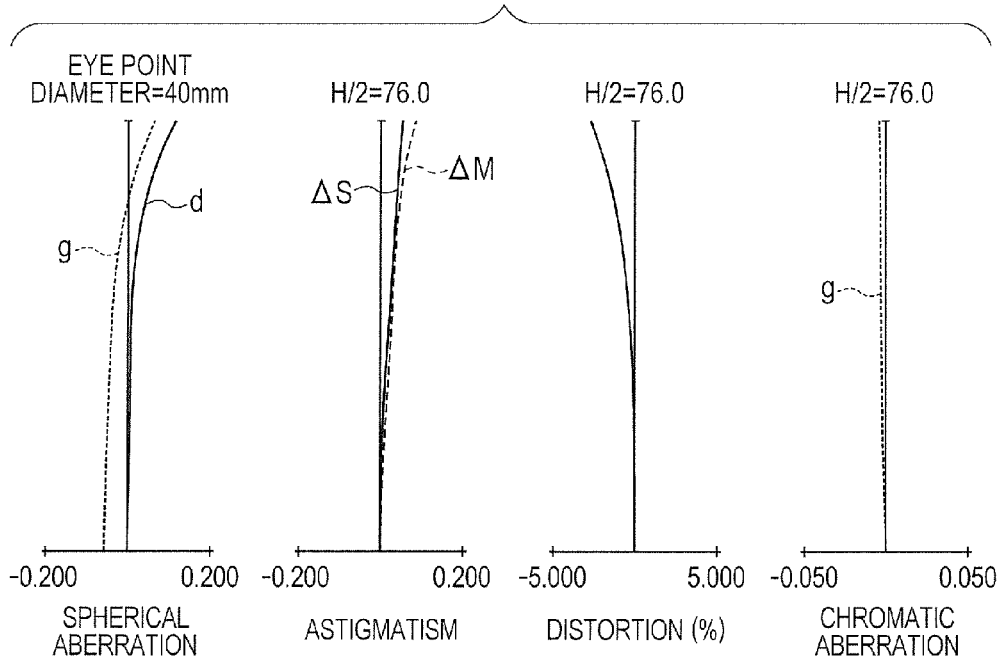

FIG. 7C
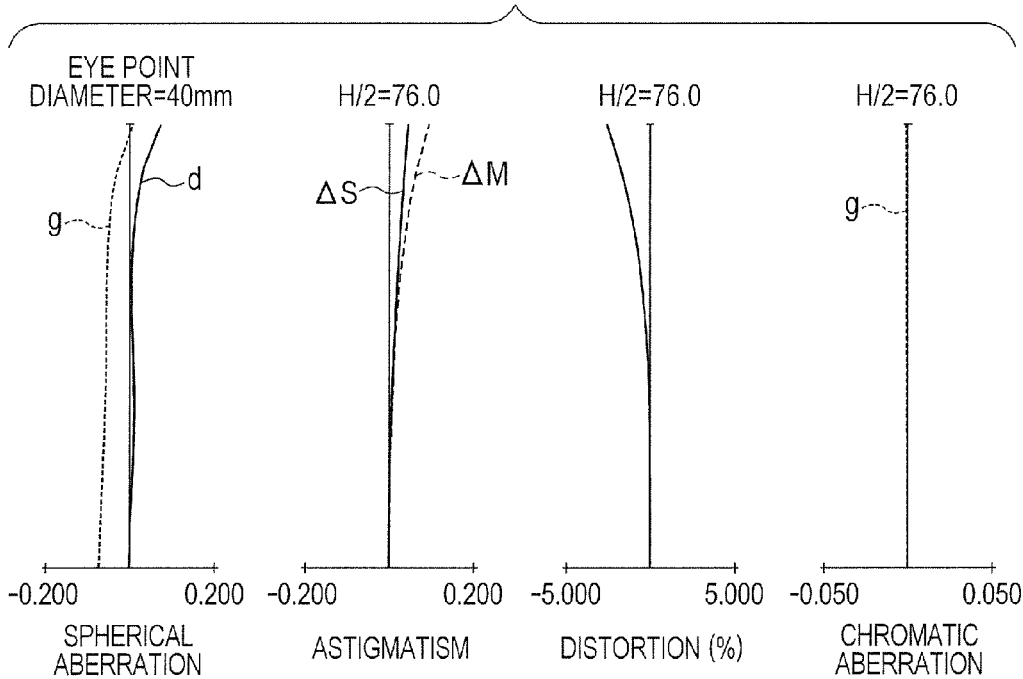
FIG. 8A1
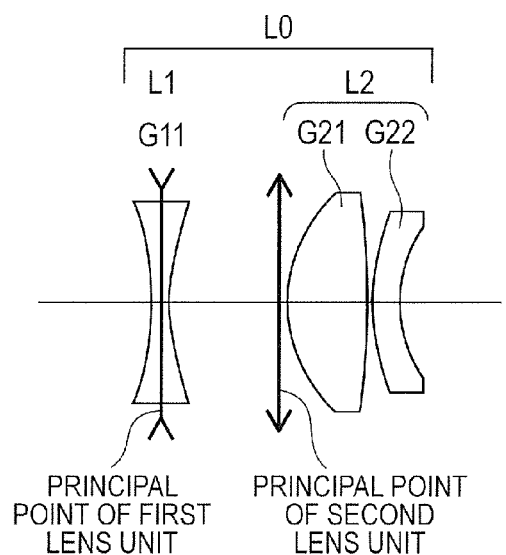
FIG. 8B1
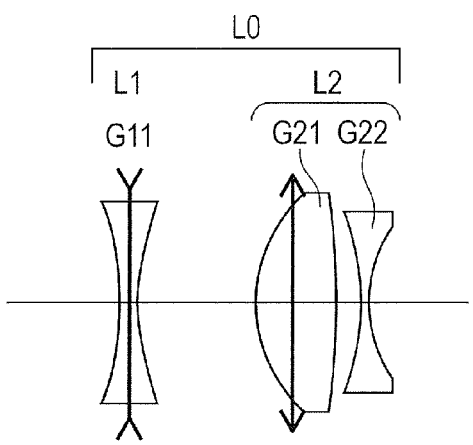

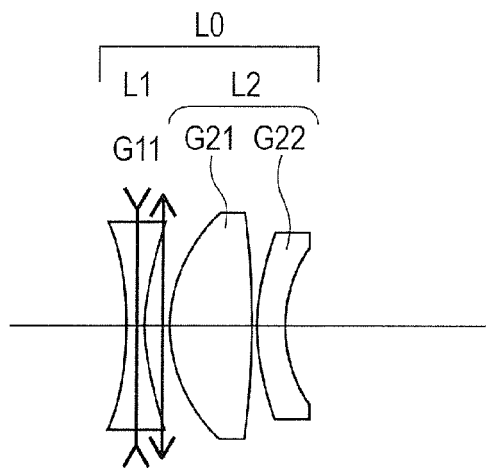
FIG. 8A2
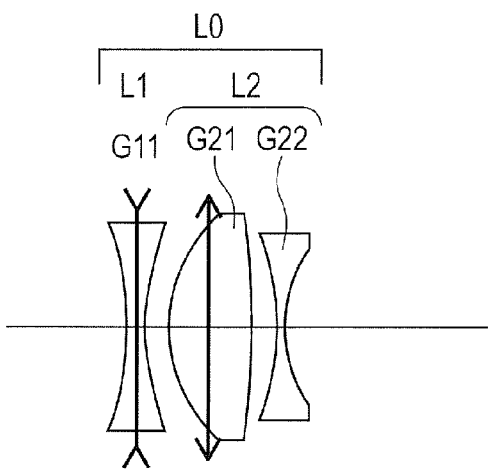
FIG. 8B2
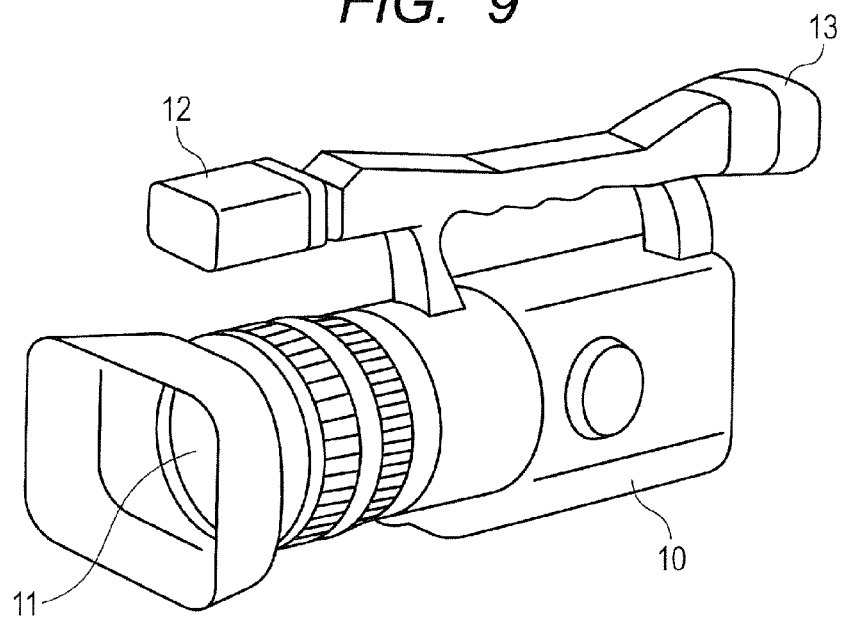
FIG. 9

EYEPIECE LENS, OBSERVATION APPARATUS INCLUDING THE EYEPIECE LENS AND IMAGE PICKUP APPARATUS INCLUDING THE EYEPIECE LENS

BACKGROUND OF THE INVENTION

Field of the Invention

The present invention relates to an eyepiece lens, an observation apparatus including the eyepiece lens and an image pickup apparatus including the eyepiece lens, which are suitable for observing an image displayed on an image displaying surface of an image displaying element through, for example, an electronic view finder to be used for a video camera, a still camera, or a broadcasting camera.

Description of the Related Art

Hitherto, in an electronic view finder to be used for an image pickup apparatus such as a video camera or a still camera, an eyepiece lens for observing an image displayed on a liquid crystal screen or the like in an enlarged manner is used. In order to increase visibility of an image displaying surface in the electronic view finder, for example, it is necessary to increase the size of the image displaying surface of the liquid crystal screen, or the like, or to increase a magnification factor for observation through use of an eyepiece lens having a long focal length.

In general, when an eyepiece lens having a long focal length is used, a movement amount of a lens unit for diopter adjustment increases at the time of diopter adjustment. As a result, the size of a finder optical system increases. Therefore, hitherto, there has been known an eyepiece lens configured such that a part of the lens units forming the eyepiece lens is moved, to thereby adjust the diopter with a small movement amount and thus achieve a size reduction of the finder optical system.

In Japanese Patent Application Laid-Open No. 2004-109961, there is disclosed an eyepiece lens consisting of, in order from an image displaying surface side to an observation side, a first lens unit having a negative refractive power and a second lens unit having a positive refractive power. Further, the first lens unit consists of a single negative lens, and the second lens unit consists of a cemented lens formed by cementing together a positive lens and a negative lens. During diopter adjustment, the first lens unit or the second lens unit is configured to move. In Japanese Patent Application Laid-Open No. 2000-98266, there is disclosed an eyepiece lens consisting of, in order from an image displaying surface side to an observation side, a first lens unit having a negative refractive power, a second lens unit having a positive refractive power, and a third lens unit having a negative refractive power. During diopter adjustment, the second lens unit is configured to move.

When the diopter is adjusted in the eyepiece lens to be used for the observation apparatus, it is important that the diopter be adjusted over a wide range based on the movement of the lens unit for diopter adjustment and that the eyepiece lens have satisfactory optical characteristics over a wide diopter adjustment range. In addition, for example, it is important that the lens unit for diopter adjustment have a small size and weight so that the diopter may be adjusted quickly and easily.

In order to obtain an eyepiece lens satisfying such requirements, it is important to appropriately configure the lens structure of the eyepiece lens, the lens structure of the lens unit for diopter adjustment, and the like. In addition, when an image displaying surface having a large size is used, it is important to appropriately set, for example, a ratio of the refractive power of each lens unit forming the eyepiece lens to the size of the image displaying surface, in particular, a ratio of the refractive power of the lens unit for diopter adjustment to the size of the image displaying surface.

In the eyepiece lens disclosed in Japanese Patent Application Laid-Open No. 2004-109961, the shape of the negative lens on the observation side is not appropriate when this eyepiece lens is applied to a finder optical system using an image displaying surface having a large size. Therefore, when the second lens unit is moved during diopter adjustment, a principal point of the second lens unit cannot be moved sufficiently toward the image displaying surface side, and hence diopter adjustment to a negative diopter is often limited. In the eyepiece lens disclosed in Japanese Patent Application Laid-Open No. 2000-98266, a lateral chromatic aberration varies greatly during diopter adjustment, and hence it often becomes difficult to obtain high optical characteristics over a wide diopter adjustment range.

SUMMARY OF THE INVENTION

According to one embodiment of the present invention, there is provided an eyepiece lens to be used for observing an image displayed on an image displaying surface, the eyepiece lens consisting of, in order from the image displaying surface side to an observation side: a first lens unit having a negative refractive power; and a second lens unit having a positive refractive power, in which the first lens unit consists of one negative lens, and the second lens unit consists of, in order from the image displaying surface side to the observation side, a positive lens and a negative lens that has a concave surface facing the observation side, and in which during adjustment of a diopter, the first lens unit is configured to not move, and the second lens unit is configured to move.

Further features of the present invention will become apparent from the following description of exemplary embodiments with reference to the attached drawings.

BRIEF DESCRIPTION OF THE DRAWINGS

FIG. 3A is aberration diagrams of the eyepiece lens according to Example 1.

FIG. 3B is aberration diagrams of the eyepiece lens according to Example 1.

FIG. 7A is aberration diagrams of the eyepiece lens according to Example 3.

FIG. 7B is aberration diagrams of the eyepiece lens according to Example 3.

FIG. 7C is aberration diagrams of the eyepiece lens according to Example 3.

FIG. 8A1 and FIG. 8A2 are explanatory views of a lens shape of a second lens unit of the present invention.

FIG. 8B1 and FIG. 8B2 are explanatory views of a lens shape of a second lens unit of the related art.

FIG. 9 is a view for schematically illustrating a main part of an image pickup apparatus according to the present invention.

DESCRIPTION OF THE EMBODIMENTS

Preferred embodiments of the present invention will now be described in detail in accordance with the accompanying drawings.

Now, an eyepiece lens and an observation apparatus including the same according to the present invention are described. The eyepiece lens according to the present invention is used for observing an image displayed on an image displaying surface. The eyepiece lens consists of, in order from an image displaying surface side to an observation side: a first lens unit having a negative refractive power; and a second lens unit having a positive refractive power. The first lens unit consists of one negative lens, and the second lens unit consists of, in order from the image displaying surface side to the observation side, a positive lens and a negative lens that has a concave surface facing the observation side. During adjustment of a diopter, the first lens unit is configured to not move, and the second lens unit is configured to move.

The observation apparatus according to the present invention includes an image displaying element configured to display an image and an eyepiece lens for observing image information displayed on an image displaying surface of the image displaying element. An image pickup apparatus of the present invention includes: an image pickup element configured to photo-electric convert an image of an object; an image displaying element configured to display an image of an object acquired by the image pickup element; and an eyepiece lens for observing the image information displayed on the image displaying surface of the image displaying element.

Figure 1:
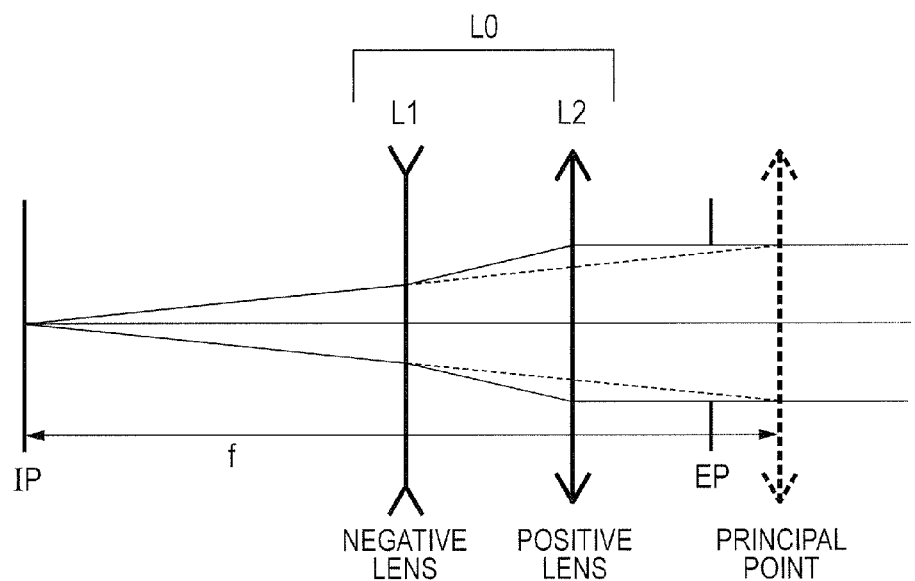
FIG. 1 is an explanatory view of a paraxial refractive power arrangement of an eyepiece lens according to one embodiment of the present invention.
Figure 2:
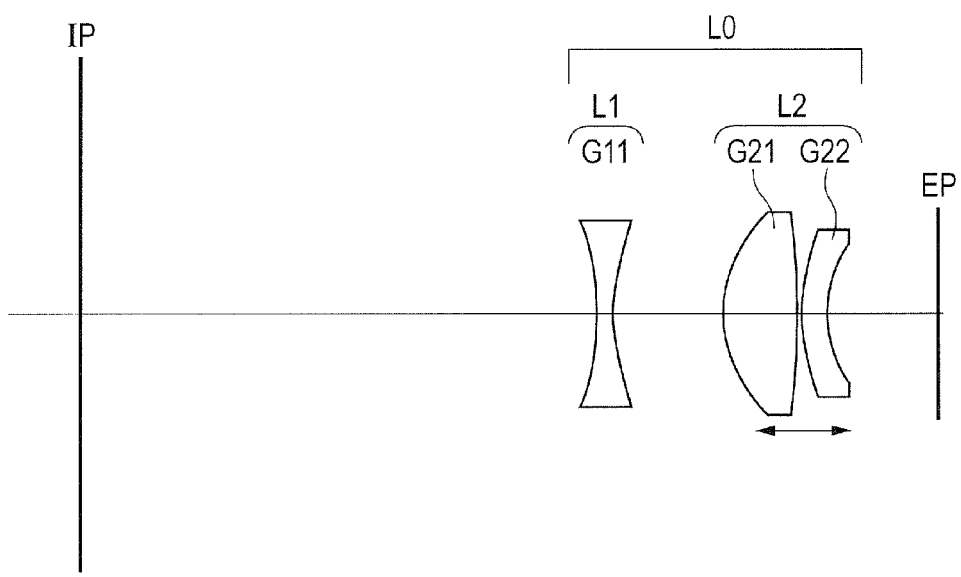
FIG. 2 is a lens cross-sectional view of an eyepiece lens according to Example 1 of the present invention.
Figure 3C:
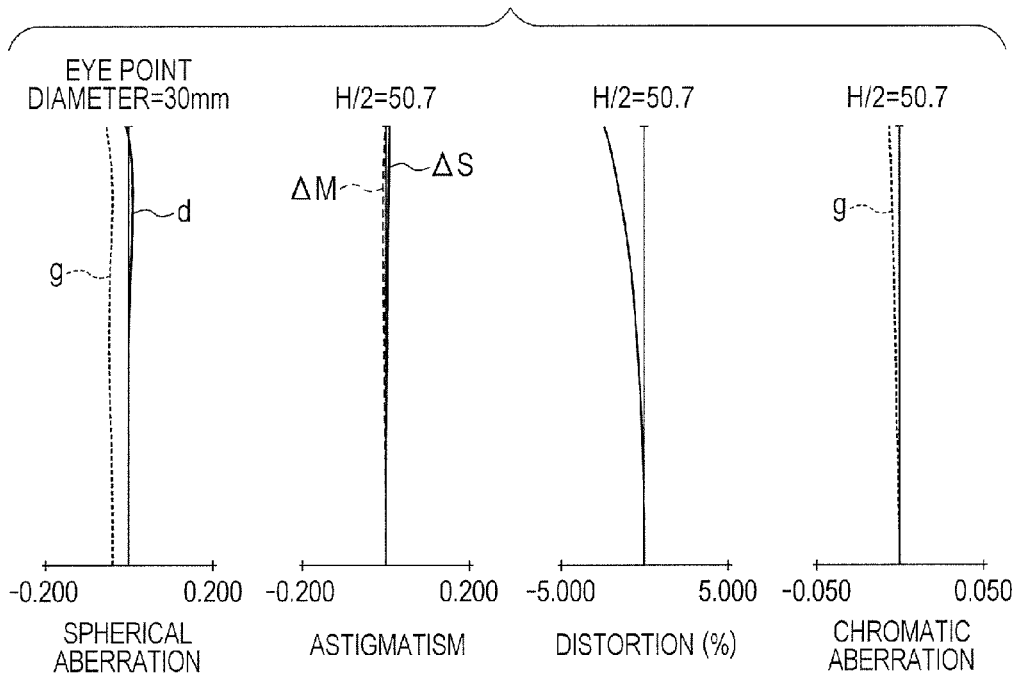
FIG. 3C is aberration diagrams of the eyepiece lens according to Example 1.

FIG. 1 is an explanatory view of a paraxial refractive power arrangement of the eyepiece lens according to the present invention. FIG. 2 is a lens cross-sectional view of an eyepiece lens according to Example 1 of the present invention. FIG. 3A, FIG. 3B, and FIG. 3C are aberration diagrams of the eyepiece lens according to Example 1 of the present invention at the diopters of −5.5 diopters, 0 diopters, and +2.0 diopters, respectively.

Figure 4:
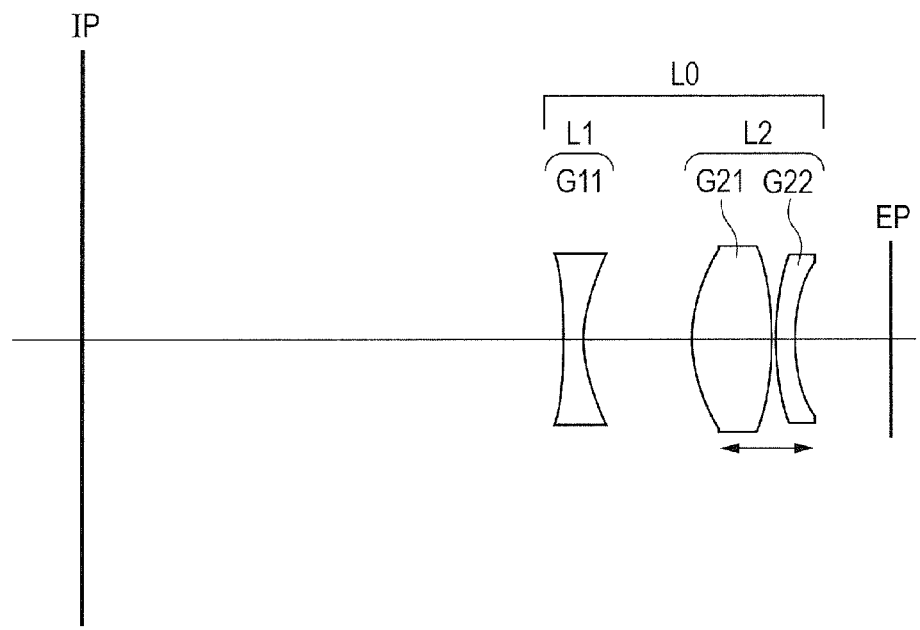
FIG. 4 is a lens cross-sectional view of an eyepiece lens according to Example 2 of the present invention.
Figure 5A:
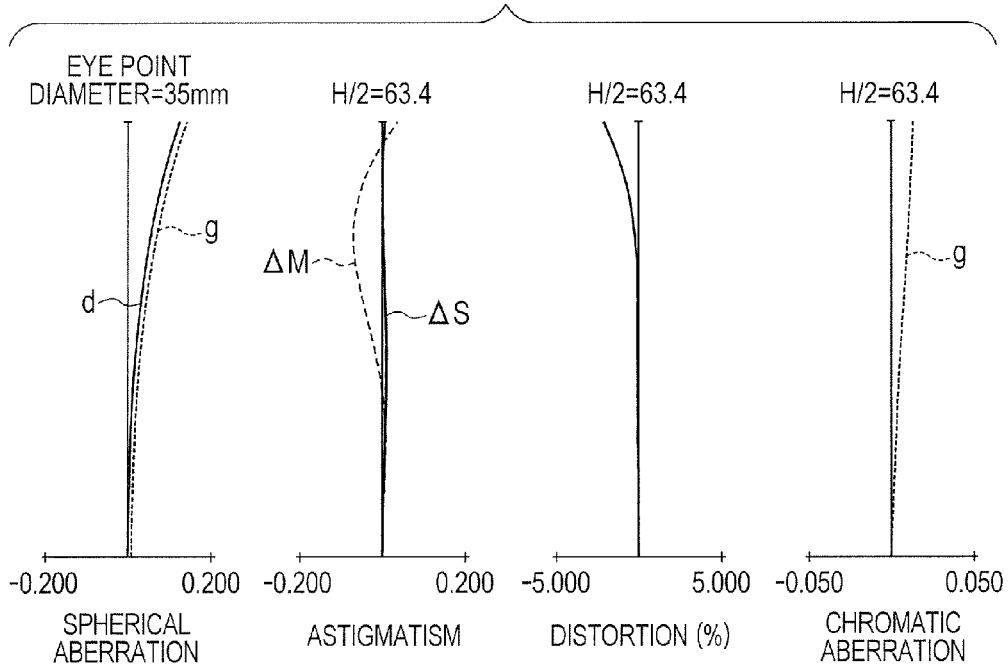
FIG. 5A is aberration diagrams of the eyepiece lens according to Example 2.
Figure 5B:
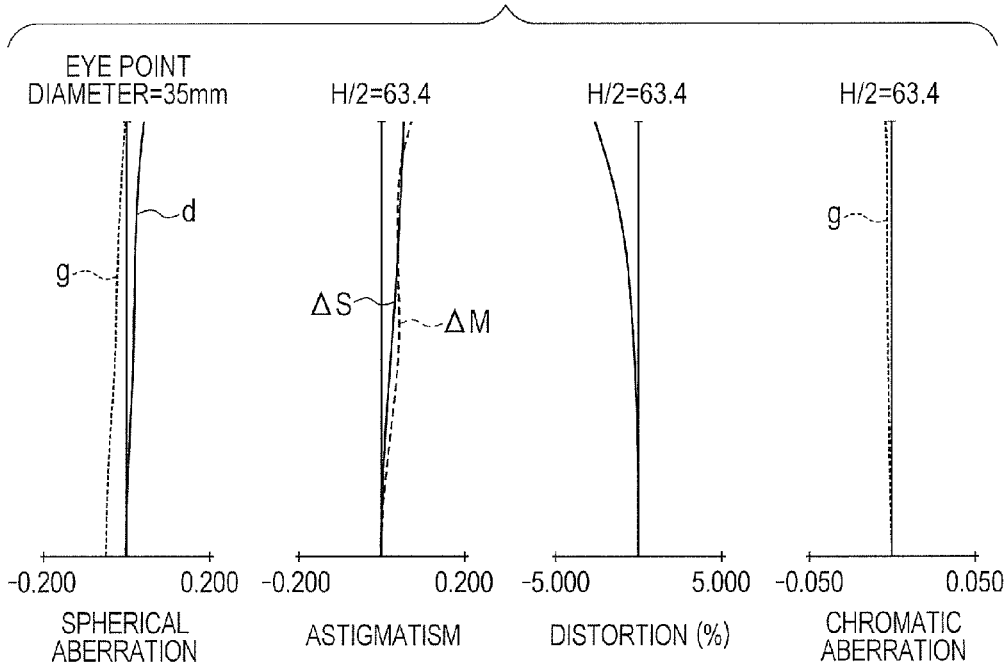
FIG. 5B is aberration diagrams of the eyepiece lens according to Example 2.
Figure 5C:
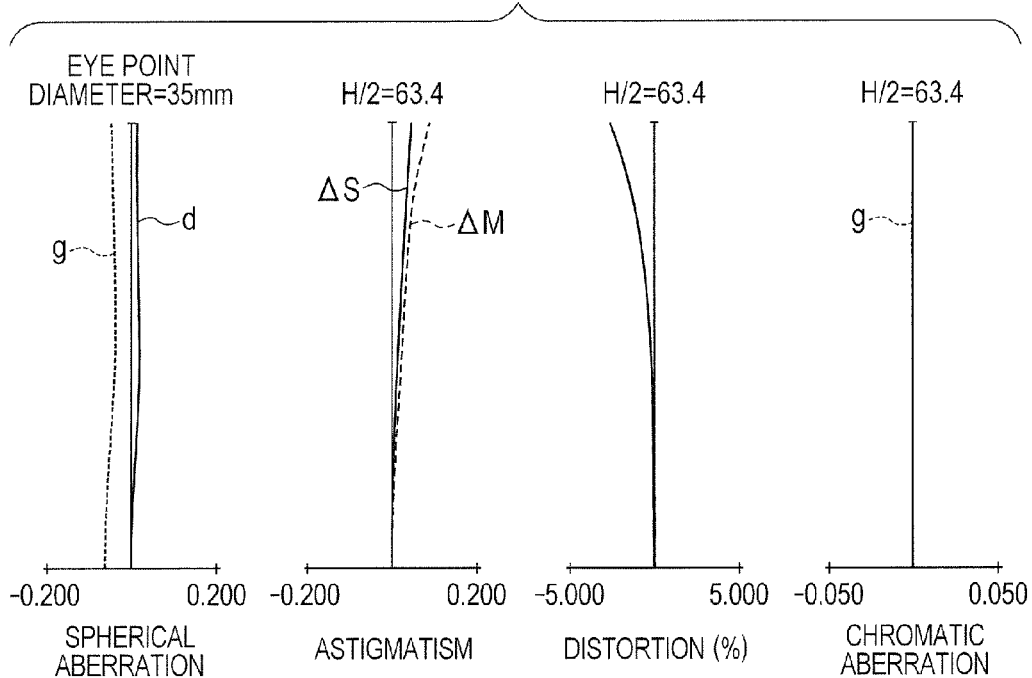
FIG. 5C is aberration diagrams of the eyepiece lens according to Example 2.
Figure 6:
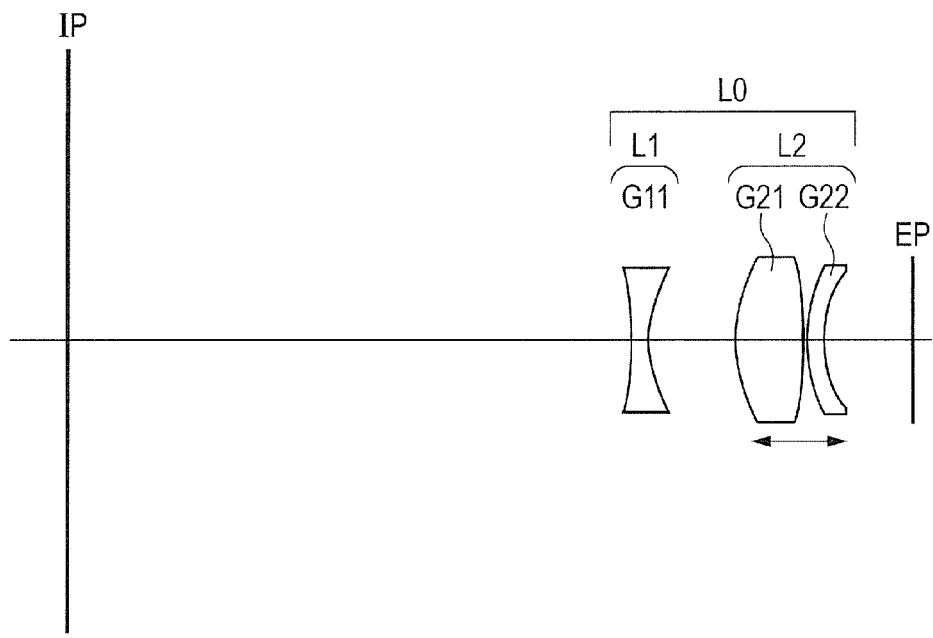
FIG. 6 is a lens cross-sectional view of an eyepiece lens according to Example 3 of the present invention.

FIG. 4 is a lens cross-sectional view of an eyepiece lens according to Example 2 of the present invention. FIG. 5A, FIG. 5B, and FIG. 5C are aberration diagrams of the eyepiece lens according to Example 2 of the present invention at the diopters of −5.5 diopters, 0 diopters, and +2.0 diopters, respectively. FIG. 6 is a lens cross-sectional view of an eyepiece lens according to Example 3 of the present invention. FIG. 7A, FIG. 7B, and FIG. 7C are aberration diagrams of the eyepiece lens according to Example 3 of the present invention at the diopters of −5.5 diopters, 0 diopters, and +2.0 diopters, respectively. FIG. 8A1 to FIG. 8B2 are explanatory views for illustrating the lens structure of the eyepiece lens according to the present invention. FIG. 9 is a view for schematically illustrating a main part of an image pickup apparatus according to the present invention.

The eyepiece lens of each of Examples is an eyepiece lens to be used for an electronic view finder (observation apparatus) of an image pickup apparatus, e.g., a digital camera or a video camera. In the lens cross-sectional views and the paraxial refractive power arrangement view, the left side corresponds to a display panel side (image displaying surface side), and the right side corresponds to an observation side (exit pupil side). In the lens cross-sectional views and the paraxial refractive power arrangement view, an eyepiece lens L0 and an image displaying surface IP of an image displaying element are illustrated. The image displaying surface IP is formed of, for example, a liquid crystal panel or an organic EL panel. The eyepiece lens L0 consists of a first lens unit L1 having a negative refractive power and a second lens unit L2 having a positive refractive power. An eye point (exit pupil) EP for observation is also illustrated in the views.

Of the aberration diagrams, in the spherical aberration diagram, a solid line d indicates a d-line (wavelength: 587.6 nm), and a two-dot chain line g indicates a g-line (wavelength: 435.8 nm). In the astigmatism diagram, a solid line ΔS indicates a sagittal image plane of the d-line, and a broken line ΔM indicates a meridional image plane of the d-line. Distortion is indicated by the d-line. The lateral chromatic aberration is indicated by the g-line. Symbol H represents a diagonal line length of the image displaying surface. Numerical values of the aberration diagrams are values obtained by expressing numeral data to be described below in units of mm.

The eyepiece lens L0 according to the present invention consists of, in order from the image displaying surface IP side to the observation side (eye point side), the first lens unit L1 having a negative refractive power and the second lens unit L2 having a positive refractive power. With this structure, a telephoto-type lens arrangement as viewed from the observation side is obtained, and the principal point of the entire system is brought toward the observation side with respect to the eyepiece lens. Thus, a lens structure length can be shortened relative to a focal length of the entire system of the eyepiece lens, to thereby achieve reduction in size of the eyepiece lens. As used herein, the phrase "lens structure length" refers to a distance from a first lens surface (light incident surface) on the image displaying surface side to a final lens surface (light incident surface) on the observation side.

Next, in the eyepiece lens L0 according to the present invention, the first lens unit consists of one negative lens. The second lens unit L2 consists of a positive lens and a negative lens that has a concave surface facing the observation side. During adjustment of a diopter, the first lens unit L1 is configured to not move, and the second lens unit L2 is configured to move in an optical axis direction. Through use of the positive lens and the negative lens for the second lens unit L2 serving as a lens unit configured to move, the lateral chromatic aberration is reduced, and high optical characteristics are obtained over the entire diopter adjustment range.

Further, the positive refractive power of the second lens unit L2 is larger than a positive refractive power of the entire system of the eyepiece lens. Thus, the diopter is changed greatly by a movement amount smaller than when the diopter is adjusted by moving the entire system of the eyepiece lens. With this, a wide diopter adjustment range can be obtained easily.

The eyepiece lens according to the present invention is realized by satisfying the structure described above. Further, in order to obtain an eyepiece lens having a small size in its entire system, a wide diopter adjustment range, and high optical characteristics when the eyepiece lens according to the present invention is used in a finder optical system using an image displaying apparatus having a large size, it is preferred that at least one of the following conditional expressions be satisfied.

A focal length of the first lens unit L1 is represented by f1, and a focal length of the second lens unit L2 is represented by f2. A focal length of the eyepiece lens L0, when the diopter is 0 diopters, is represented by f. An Abbe number of a material of the positive lens included in the second lens unit L2 is represented by vd1, and an Abbe number of a material of the negative lens included in the second lens unit L2 is represented by vd2. A curvature radius of a lens surface of the negative lens included in the second lens unit L2 on the image displaying surface side is represented by R1, and a paraxial curvature radius of a lens surface of the negative lens on the observation side is represented by R2.

Herein, an Abbe number vd is a numeral value expressed as follows:

$$vd=(Nd-1)/(NF-NC)$$

where NF, NC, and Nd represent refractive indices of a material with respect to an F-line (486.1 nm), a C-line (656.3 nm), and the d-line (587.6 nm), respectively.

In this case, it is preferred that at least one of the following conditional expressions be satisfied.

$$-2.0<f1/f2<-0.3 \quad (1)$$

$$-11.0<f/f1<-1.0 \quad (2)$$

$$15.0<vd1-vd2<45.0 \quad (3)$$

$$1.0<(R1+R2)/(R1-R2)<50.0 \quad (4)$$

$$15.0<vd2<30.0 \quad (5)$$

Next, technical meanings of the conditional expressions given above are described. The conditional expression (1) defines a ratio of the focal length of the first lens unit L1 to the focal length of the second lens unit L2. When the ratio exceeds the upper limit of the conditional expression (1) and the focal length of the second lens unit L2 relative to that of the first lens unit L1 thus becomes longer (the absolute value of the focal length becomes larger), the movement amount of the second lens unit L2 during diopter adjustment becomes larger. As a result, the size of the eyepiece lens increases. When the ratio falls below the lower limit of the conditional expression (1) and the focal length of the second lens unit L2 relative to that of the first lens unit L1 thus becomes shorter, the spherical aberration, the astigmatism, and others increase, and it becomes difficult to correct those various aberrations. As a result, the diopter within a visual field for observation becomes less even.

It is more preferred that the numeral value range of the conditional expression (1) be set as follows.

$$-1.5<f1/f2<-0.4 \quad (1a)$$

The conditional expression (2) defines a ratio of the focal length of the entire system of the eyepiece lens L0 to the focal length of the first lens unit L1. When the ratio exceeds the upper limit of the conditional expression (2) and a negative focal length of the first lens unit L1 thus becomes longer (the absolute value of the focal length becomes larger), a gap between the image displaying surface and the first lens unit increases. As a result, the size of the eyepiece lens increases. In contrast, when the ratio falls below the lower limit of the conditional expression (2) and the negative focal length of the first lens unit L1 thus becomes shorter, barrel distortion increases. As a result, it becomes difficult to correct the distortion occurring in this case.

It is more preferred that the numeral value range of the conditional expression (2) be set as follows.

$$-9.0<f/f1<-2.5 \quad (2a)$$

The conditional expression (3) defines a difference in Abbe number between the material of the positive lens included in the second lens unit L2 and the material of the negative lens included in the second lens unit L2. When the difference exceeds the upper limit of the conditional expression (3) and the difference in Abbe number thus becomes excessively large, in order to satisfy an achromatic condition within the second lens unit L2, it is necessary to reduce both of the refractive power of the positive lens and the refractive power of the negative lens.

In this case, an effect of bringing the principal point of the second lens unit L2 toward the first lens unit L1 side by the positive lens becomes insufficient. As a result, it becomes difficult to enlarge the diopter adjustment range toward a negative diopter. When the difference falls below the lower limit of the conditional expression (3) and the difference in Abbe number thus becomes excessively small, in order to satisfy the achromatic condition within the second lens unit L2, it is necessary to increase both of the refractive power of the positive lens and the refractive power of the negative lens. In this case, the spherical aberration and astigmatism are generated in a large amount from the second lens unit L2. As a result, it becomes difficult to correct those various aberrations.

It is more preferred that the numeral value range of the conditional expression (3) be set as follows.

$$20.0<vd1-vd2<42.0 \quad (3a)$$

The conditional expression (4) defines a meniscus shape of the negative lens included in the second lens unit L2. When a ratio of the conditional expression (4) exceeds the upper limit thereof and the values of the curvature radii of the lens surface on the image displaying surface side and the lens surface on the observation side thus become close to each other, the negative refractive power of the negative lens becomes weak (the absolute value of the negative refractive power becomes smaller). As a result, it becomes difficult to correct the lateral chromatic aberration within the second lens unit L2. When the ratio of the conditional expression (4) falls below the lower limit thereof and the negative lens thus no longer has the meniscus shape having the concave surface facing the observation side, the principal point of the second lens unit L2 cannot be sufficiently brought toward the first lens unit L1 side. As a result, it becomes difficult to enlarge the diopter adjustment range toward a negative diopter.

It is more preferred that the numeral value range of the conditional expression (4) be set as follows.

$$2.0<(R1+R2)/(R1-R2)<30.0 \quad (4a)$$

The conditional expression (5) defines the Abbe number of the material of the negative lens included in the second lens unit L2. When the Abbe number exceeds the upper limit of the conditional expression (5) and the Abbe number of the material of the negative lens thus becomes larger, correction of the lateral chromatic aberration by the negative lens becomes insufficient. When the Abbe number falls below the lower limit of the conditional expression (5) and the Abbe number of the material of the negative lens thus becomes smaller, the dispersion increases and the lateral chromatic aberration is thus generated in a large amount from the negative lens, and hence this state is not preferred. It is more preferred that the numeral value range of the conditional expression (5) be set as follows.

$$17.0 < vd2 < 27.0 \tag{5a}$$

Next, in the observation apparatus including the image displaying element configured to display the image and the eyepiece lens for observing the image information displayed on the image displaying surface of the image displaying element, it is preferred that at least one of the following conditional expressions be satisfied. The diagonal length of the image displaying surface IP is represented by H. A movement amount of the second lens unit L2 when the diopter is adjusted from −5.5 diopters to +2.0 diopters is represented by D.

As used herein, the phrase "movement amount" refers to a difference between a position of the second lens unit L2 on the optical axis at the diopter of −5.5 diopters and a position of the second lens unit L2 on the optical axis at the diopter of +2.0 diopters. The sign of the movement amount is defined as being positive when the second lens unit L2 is located on the observation side at the diopter of +2.0 diopters as compared with its position at the diopter of −5.5 diopters. The sign of the movement amount is defined as being negative when the second lens unit L2 is located on the image displaying surface side at the diopter of +2.0 diopters as compared with its position at the diopter of −5.5 diopters. In this case, it is preferred that at least one of the following conditional expressions be satisfied.

$$0.5 < H/f2 < 2.0 \tag{6}$$

$$0.5 < H/D < 5.5 \tag{7}$$

Next, technical meanings of the conditional expressions (6) and (7) are described. The conditional expression (6) defines a ratio of the diagonal length of the image displaying surface to the focal length of the second lens unit L2. When the ratio exceeds the upper limit of the conditional expression (6) and the focal length of the second lens unit L2 relative to the diagonal length of the image displaying surface thus becomes shorter, the spherical aberration, the astigmatism, and others increase, and it becomes difficult to correct those various aberrations. As a result, the diopter within the visual field for observation becomes less even.

When the ratio falls below the lower limit of the conditional expression (6) and the focal length of the second lens unit L2 relative to the diagonal length of the image displaying surface thus becomes longer, the size of the eyepiece lens L0 increases because the movement amount of the second lens unit L2 during diopter adjustment becomes larger, and hence this state is not preferred. It is more preferred that the numeral value range of the conditional expression (6) be set as follows.

$$0.6 < H/f2 < 1.7 \tag{6a}$$

The conditional expression (7) defines a ratio of the diagonal length of the image displaying surface to the movement amount of the second lens unit L2 when the diopter is adjusted from −5.5 diopters to +2.0 diopters. When the ratio exceeds the upper limit of the conditional expression (7) and the diagonal length of the image displaying surface relative to the movement amount of the second lens unit L2 thus becomes larger, effective diameters of the first lens unit L1 and the second lens unit L2 become larger. As a result, the size of the eyepiece lens increases.

When the ratio falls below the lower limit of the conditional expression (7) and the diagonal length of the image displaying surface relative to the movement amount of the second lens unit L2 thus becomes smaller, the effective diameters of the first lens unit L1 and the second lens unit L2 become smaller. In this case, some axial rays that pass through a peripheral portion of the lenses are more liable to pass through a predetermined aperture at the eye point, and the spherical aberration increases as a result. Therefore, this state is not preferred.

It is more preferred that the numeral value range of the conditional expression (7) be set as follows.

$$0.7 < H/D < 4.5 \tag{7a}$$

It is more preferred that the numerical value ranges of each of the conditional expressions (1a) to (7a) be within the following ranges.

$$-1.1 < f1/f2 < -0.5 \tag{1b}$$

$$-8.0 < f/f1 < -3.0 \tag{2b}$$

$$25.0 < vd1 - vd2 < 40.0 \tag{3b}$$

$$3.0 < (R1+R2)/(R1-R2) < 20.0 \tag{4b}$$

$$20.0 < vd2 < 25.0 \tag{5b}$$

$$0.7 < H/f2 < 1.5 \tag{6b}$$

$$1.0 < H/D < 3.5 \tag{7b}$$

Thus, according to each of Examples, in the observation apparatus using the image displaying apparatus having a large size, the eyepiece lens having a small size in its entire system, a wide diopter adjustment range, and high optical characteristics can be obtained. In each of Examples, it is preferred that each of the first lens unit L1 and the second lens unit L2 have at least one surface having an aspherical shape. With the structure in which the first lens unit L1 serving as a lens unit configured to not move during diopter adjustment has an aspherical lens, it becomes easier to correct the distortion over the entire system of the eyepiece lens. As a result, the image displayed on the image displaying surface can be observed without distortion over a wide diopter adjustment range.

In addition, with the structure in which the second lens unit L2 serving as the lens unit configured to move during diopter adjustment has an aspherical lens, variations in the spherical aberration and the astigmatism due to diopter adjustment can be reduced, and the refractive power of each lens can be increased. As a result, the movement amount of the lens unit required for changing the diopter can be reduced, and hence it becomes easier to reduce the size of the eyepiece lens.

As described above, according to the present invention, the eyepiece lens having a small size in its entire system, a wide diopter adjustment range, and high optical characteristics over the entire diopter adjustment range can be obtained.

Next, the lens structure of each of Examples is described. The eyepiece lens L0 of each of Examples consists of, in order from the image displaying surface IP side to the eye point EP side (observation side), the first lens unit L1 having a negative refractive power and the second lens unit L2 having a positive refractive power. During diopter adjustment, the first lens unit L1 is fixed, and the second lens unit L2 is moved in the optical axis direction. In the diopter adjustment, the diopter changes to a negative diopter when the second lens unit L2 is moved toward the image displaying surface IP side, whereas the diopter changes to a positive diopter when the second lens unit L2 is moved toward the eye point EP side.

The first lens unit L1 consists of one negative lens G11. The second lens unit L2 consists of, in order from the image displaying surface side to the observation side, a positive lens G21 and a negative lens G22. In Example 1, a material of each of the negative lens G11 of the first lens unit L1 and the positive lens G21 of the second lens unit L2 is a cycloolefin polymer resin, and a material of the negative lens G22 of the second lens unit L2 is a special polycarbonate resin.

In Example 2, a material of the negative lens G11 of the first lens unit L1 is glass, a material of the positive lens G21 of the second lens unit L2 is a cycloolefin polymer resin, and a material of the negative lens G22 of the second lens unit L2 is a special polycarbonate resin. In Example 3, a material of each of the negative lens G11 of the first lens unit L1 and the positive lens G21 of the second lens unit L2 is glass, and a material of the negative lens G22 of the second lens unit L2 is a special polycarbonate resin.

With the structure in which both lens surfaces of the negative lens G11 of the first lens unit L1 have a concave shape and also have an aspherical shape, the distortion is mainly corrected satisfactorily. With the structure in which both surfaces of the positive lens G21 of the second lens unit L2 have a convex shape and also have an aspherical shape, the spherical aberration and the astigmatism are mainly corrected satisfactorily. Further, with the structure in which the negative lens G22 has a meniscus shape concave on the observation side and both surfaces thereof have an aspherical shape, the spherical aberration and the astigmatism are mainly corrected satisfactorily.

Now, a further advantage obtained by the structure in which the negative lens G22 has a meniscus shape is described with reference to FIG. 8A1 to FIG. 8B2. When the negative lens G22 has the meniscus shape as illustrated in FIG. 8A1, the principal point of the second lens unit L2, which is illustrated as the double-headed arrow in each of FIG. 8A1 to FIG. 8B2, can be moved toward the first lens unit L1 side. With this, as illustrated in FIG. 8A2, the principal points of the first lens unit L1 and the second lens unit L2 can be brought close to each other without causing interference between the first lens unit L1 and the second lens unit L2. As a result, it becomes easier to enlarge the diopter adjustment range toward a negative diopter.

However, when the negative lens of the second lens unit L2 does not have the meniscus shape, as illustrated in FIG. 8B1, the principal point of the second lens unit L2 cannot be moved toward the first lens unit L1 side by a large amount. Therefore, as illustrated in FIG. 8B2, there is a limit in bringing the principal points of the first lens unit L1 and the second lens unit L2 close to each other without causing interference between the first lens unit L1 and the second lens unit L2. As a result, it becomes difficult to enlarge the diopter adjustment range toward a negative diopter. For the above-mentioned reason, the structure in which the negative lens G22 has a meniscus shape concave on the observation side is adopted.

Further, the image displaying surface herein may be an element configured to electrically display an image, e.g., a liquid crystal display element. As another example, the image displaying surface may be an image formation position where an image of an object is formed, or may be a diffusion plate arranged at the image formation position. Moreover, a plate for protecting the image displaying surface and the lenses may be arranged between the image displaying surface and the lens units or between the lens units and the eye point of an observer. In addition, the eye point may be moved in the optical axis direction as long as rays from the most peripheral portion of the image displaying surface can pass through a pupil of the observer.

In Example 1, the diagonal length of the image displaying surface is 50.7 mm, and the eye point diameter is 30 mm. In Example 2, the diagonal length of the image displaying surface is 63.4 mm, and the eye point diameter is 35 mm. In Example 3, the diagonal length of the image displaying surface is 76 mm, and the eye point diameter is 40 mm.

The image pickup apparatus according to the present invention includes: an image pickup element configured to photo-electric convert an image of an object; an image displaying element configured to display an image of the object acquired by the image pickup element; and an eyepiece lens to be used for observing image information displayed on an image displaying surface of the image displaying element.

Next, the image pickup apparatus according to the present invention is described with reference to FIG. 9, taking a video camera as an example. The video camera illustrated in FIG. 9 includes a video camera main body (image pickup apparatus main body) 10, a photographing optical system (image pickup optical system) 11 configured to form an object image on an image pickup element (not shown), and a sound collection microphone 12. The video camera also includes an observation apparatus (electronic view finder) 13 to be used for observing an object image displayed on an image displaying element (not shown) through use of the eyepiece lens according to the present invention. The image displaying element is formed of a liquid crystal panel or the like, and an image of an object formed by the photographing optical system 11 or the like is displayed on the image displaying element. Through such application of the observation apparatus according to the present invention to the image pickup apparatus, e.g., the video camera, an image of an object can be observed satisfactorily.

Numerical data corresponding to each of Examples of the present invention is described below. In the numerical data, symbol ri represents a paraxial curvature radius of an i-th surface counted from the image displaying surface to the observation side, and symbol di represents a gap between the i-th surface and an (i+1)th surface on the optical axis. Further, symbol ndi represents a refractive index of a glass material between the i-th surface and the (i+1)th surface with respect to the d-line (wavelength=578.6 nm), and symbol vdi represents an Abbe number of the glass material between the i-th surface and the (i+1)th surface with respect to the d-line. Symbol r1 represents the image displaying surface, and symbol r8 represents the eye point EP. The gap d indicated as "Variable" is a gap that is variable depending on diopter adjustment (diopter).

In the numerical data, a unit of length is in [mm] unless otherwise specified. However, an eyepiece optical system L can achieve equivalent optical characteristics even when enlarged proportionally or reduced proportionally, and hence the unit is not limited to [mm], and other appropriate units can be used. In each Numerical Example, a surface having a surface number marked with the asterisk (*) has an aspherical shape defined by the following expression (8).

$$x=(h^2/R)/[1+[1-(1+k)(h/R)^2]^{1/2}]+A4h^4+A6h^6+A8h^8 \quad (8)$$

In this expression, x represents a distance from a vertex of the lens surface in the optical axis direction, h represents a height from the optical axis in the direction perpendicular to the optical axis, R represents a paraxial curvature radius at the vertex of the lens surface, k represents a conic constant, and A4, A6, and A8 represent respective polynomial coefficients (aspheric coefficients). In each table for showing the aspherical coefficients, "e−i" is an exponential representation having a base of 10, i.e., "$10^{-i}$". Further, relationships between the conditional expressions given above and respective numerical values in the numerical data are shown in Table 1.

Example 1

Unit mm

Surface data

| Surface Number | r | d | nd | vd |
|---|---|---|---|---|
| 1 | (Image displaying surface) | 122.96 | | |
| 2* | −87.448 | 4.00 | 1.53110 | 55.9 |
| 3* | 43.083 | (Variable) | | |
| 4* | 29.660 | 17.47 | 1.53110 | 55.9 |
| 5* | −138.678 | 1.00 | | |
| 6* | 54.554 | 6.00 | 1.63550 | 23.9 |
| 7* | 33.252 | (Variable) | | |
| 8 | (Eye point) | | | |

Aspherical surface data

Second surface

K = −1.07380e+000 A4 = −6.55933e−006 A6 = 2.06678e−009
Third surface

K = −8.44355e−001 A4 = −8.81230e−006 A6 = 4.23714e−009
A8 = −5.21481e−013
Fourth surface K = −2.72574e+000 A4 = 8.04176e−006 A6 = 6.26791e−010
Fifth surface K = 2.00010e+000 A4 = 3.90187e−006 A6 = −6.41274e−009
A8 = 2.82874e−012
Sixth surface K = −1.36409e+000 A4 = 1.06781e−005 A6 = −2.62080e−008
Seventh surface K = −2.89786e−001 A4 = 1.30466e−005 A6 = −1.32199e−008

Various data

| Diopter | −5.5 | 0.0 | 2.0 |
|---|---|---|---|
| f | −1,097.0 | 192.0 | 134.2 |
| d3 | 6.54 | 25.58 | 32.57 |
| d7 | 44.93 | 25.88 | 18.90 |

Example 2

Unit mm

Surface data

| Surface Number | r | d | nd | vd |
|---|---|---|---|---|
| 1 | (Image displaying surface) | 121.19 | | |
| 2* | −299.451 | 5.00 | 1.62263 | 58.2 |
| 3* | 29.388 | (Variable) | | |
| 4* | 35.913 | 20.00 | 1.53110 | 55.9 |
| 5* | −116.508 | 1.00 | | |
| 6* | 75.021 | 5.00 | 1.63550 | 23.9 |
| 7* | 55.096 | (Variable) | | |
| 8 | (Eye point) | | | |

Aspherical surface data

Second surface

K = 2.84372e+000 A4 = −5.07369e−006 A6 = −2.95730e−009
Third surface

K = −2.33551e−001 A4 = −1.26924e−005 A6 = −3.47406e−009
Fourth surface

K = −6.17824e+000 A4 = 1.08522e−005 A6 = −1.15986e−008
Fifth surface

K = 2.00588e+000 A4 = −3.23397e−006 A6 = −9.67082e−010
Sixth surface

K = 1.27269e+000 A4 = −3.73656e−006 A6 = 1.33721e−008
Seventh surface

K = 3.25450e−001 A4 = 1.32002e−007 A6 = 2.37362e−008

Various data

| Diopter | −5.5 | 0.0 | 2.0 |
|---|---|---|---|
| f | −301.2 | 235.0 | 139.1 |
| d3 | 8.38 | 27.50 | 34.90 |
| d7 | 43.05 | 23.93 | 16.53 |

Example 3

Unit mm

Surface data

| Surface Number | r | d | nd | vd |
|---|---|---|---|---|
| 1 | (Image displaying surface) | 166.57 | | |
| 2* | −324.606 | 5.00 | 1.62263 | 58.2 |
| 3* | 28.077 | (Variable) | | |
| 4* | 41.667 | 20.00 | 1.62263 | 58.2 |
| 5* | −219.254 | 1.00 | | |
| 6* | 53.25 | 5.00 | 1.63550 | 23.9 |
| 7* | 47.342 | (Variable) | | |
| 8 | (Eye point) | | | |

Aspherical surface data

Second surface

K = −7.69470e+000 A4 = −8.69918e−006 A6 = 9.47048e−010
Third surface

K = −5.52088e−001 A4 = −1.60533e−005 A6 = 3.58069e−009
Fourth surface

K = −6.90462e+000 A4 = 7.45105e−006 A6 = −7.28898e−009
Fifth surface

K = −1.99942e+000 A4 = −3.98624e−006 A6 = −4.38575e−010
Sixth surface

K = 1.90663e+000 A4 = −2.07633e−006 A6 = 3.36075e−009
Seventh surface

K = 1.01897e+000 A4 = 2.76105e−006 A6 = 1.18275e−008

-continued

Unit mm

Various data

| Diopter | −5.5 | 0.0 | 2.0 |
|---|---|---|---|
| f | −222.0 | 300.0 | 158.9 |
| d3 | 6.93 | 25.77 | 32.89 |
| d7 | 44.50 | 25.66 | 18.54 |

TABLE 1

| | Numerical Example | | |
|---|---|---|---|
| | 1 | 2 | 3 |
| H | 50.70 | 63.40 | 76.00 |
| f2 | 57.89 | 59.04 | 58.24 |
| f1 | −53.77 | −42.73 | −41.28 |
| f | 192.04 | 235.00 | 300.00 |
| D | 26.03 | 26.52 | 25.96 |
| vd1 | 55.91 | 55.91 | 58.16 |
| vd2 | 23.89 | 23.89 | 23.89 |
| R1 | 54.55 | 75.02 | 53.25 |
| R2 | 33.25 | 55.10 | 47.34 |
| Conditional Expression (1) | −0.93 | −0.72 | −0.71 |
| Conditional Expression (2) | −3.57 | −5.50 | −7.27 |
| Conditional Expression (3) | 32.02 | 32.02 | 34.27 |
| Conditional Expression (4) | 4.12 | 6.53 | 17.03 |
| Conditional Expression (5) | 23.89 | 23.89 | 23.89 |
| Conditional Expression (6) | 0.88 | 1.07 | 1.30 |
| Conditional Expression (7) | 1.95 | 2.39 | 2.93 |

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2015-119041, filed Jun. 12, 2015 which is hereby incorporated by reference herein in its entirety.

What is claimed is:

1. An eyepiece lens to be used for observing an image displayed on an image displaying surface, the eyepiece lens consisting of, in order from the image displaying surface side to an observation side:
a first lens unit having a negative refractive power; and
a second lens unit having a positive refractive power,
wherein the first lens unit consists of one negative lens, and the second lens unit consists of, in order from the image displaying surface side to the observation side, a positive lens and a negative lens that has a concave surface facing the observation side, and
wherein during adjustment of a diopter, the first lens unit is configured to not move, and the entire second lens unit is configured to move.

2. An eyepiece lens according to claim 1, wherein the following conditional expression is satisfied:

$-2.0 < f1/f2 < -0.3$, where f1 represents a focal length of the first lens unit, and f2 represents a focal length of the second lens unit.

3. An eyepiece lens according to claim 1, wherein the following conditional expression is satisfied:

$-11.0 < f/f1 < -1.0$ where f1 represents a focal length of the first lens unit, and f represents a focal length of the eyepiece lens when the diopter is 0 diopters.

4. An eyepiece lens according to claim 1, wherein the following conditional expression is satisfied:

$15.0 < vd1 - vd2 < 45.0$ where vd1 represents an Abbe number of a material of the positive lens included in the second lens unit, and vd2 represents an Abbe number of a material of the negative lens included in the second lens unit.

5. An eyepiece lens according to claim 1, wherein the following conditional expression is satisfied:

$1.0 < (R1+R2)/(R1-R2) < 50.0$ where R1 represents a curvature radius of a lens surface of the negative lens included in the second lens unit on the image displaying surface side, and R2 represents a paraxial curvature radius of a lens surface of the negative lens on the observation side.

6. An eyepiece lens according to claim 1, wherein the following conditional expression is satisfied:

$15.0 < vd2 < 30.0$ where vd2 represents an Abbe number of a material of the negative lens included in the second lens unit.

7. An observation apparatus, comprising:
an image displaying element configured to display an image; and
an eyepiece lens to be used for observing an image displayed on an image displaying surface of the image displaying element,
the eyepiece lens consisting of, in order from the image displaying surface side to an observation side:
a first lens unit having a negative refractive power; and
a second lens unit having a positive refractive power,
wherein the first lens unit consists of one negative lens, and the second lens unit consists of, in order from the image displaying surface side to the observation side, a positive lens and a negative lens that has a concave surface facing the observation side, and
wherein during adjustment of a diopter, the first lens unit is configured to not move, and the entire second lens unit is configured to move.

8. An observation apparatus according to claim 7, wherein the following conditional expression is satisfied:

$0.5 < H/f2 < 2.0$ where H represents a diagonal length of the image displaying surface, and f2 represents a focal length of the second lens unit.

9. An observation apparatus according to claim 7, wherein the following conditional expression is satisfied:

$0.5 < H/D < 5.5$ where D represents a movement amount of the second lens unit when the diopter is adjusted from −5.5 diopters to +2.0 diopters.

10. An image pickup apparatus, comprising:
an image pickup element;
an image displaying element configured to display an image acquired by the image pickup element; and
an eyepiece lens to be used for observing the image displayed on an image displaying surface of the image displaying element,
wherein the eyepiece lens consists of, in order from the image displaying surface side to an observation side:
a first lens unit having a negative refractive power; and
a second lens unit having a positive refractive power,
wherein the first lens unit consists of one negative lens, and the second lens unit consists of, in order from the image displaying surface side to the observation side, a positive lens and a negative lens that has a concave surface facing the observation side, and wherein during adjustment of a diopter, the first lens unit is configured to not move, and the entire second lens unit is configured to move.

* * * * *